(12) United States Patent
Heger et al.

(10) Patent No.: US 8,612,150 B2
(45) Date of Patent: Dec. 17, 2013

(54) DEVICE AND METHOD FOR DETERMINING THE POSITION OF ANOTHER ROAD USER

(75) Inventors: Thomas Heger, Vinningen (DE); Kathleen Tischler, Dresden (DE)

(73) Assignee: Robert Bosch GmbH, Stuttgart (DE)

( * ) Notice: Subject to any disclaimer, the term of this patent is extended or adjusted under 35 U.S.C. 154(b) by 453 days.

(21) Appl. No.: 12/735,439

(22) PCT Filed: Nov. 11, 2008

(86) PCT No.: PCT/EP2008/065309
§ 371 (c)(1),
(2), (4) Date: Nov. 1, 2010

(87) PCT Pub. No.: WO2009/097917
PCT Pub. Date: Aug. 13, 2009

(65) Prior Publication Data
US 2011/0046882 A1 Feb. 24, 2011

(30) Foreign Application Priority Data
Feb. 4, 2008 (DE) .......................... 10 2008 007 347

(51) Int. Cl.
*G01C 21/26* (2006.01)

(52) U.S. Cl.
USPC .......................................... 701/532; 348/140

(58) Field of Classification Search
USPC ............. 701/532, 534, 117, 472, 602, 1, 300, 701/93, 301; 340/435, 995.1, 988; 342/357.3; 348/208.1; 382/107
See application file for complete search history.

(56) References Cited

U.S. PATENT DOCUMENTS

| | | | |
|---|---|---|---|
| 6,188,959 B1 * | 2/2001 | Schupfner | 701/445 |
| 6,289,278 B1 * | 9/2001 | Endo et al. | 701/431 |
| 6,842,183 B2 * | 1/2005 | Higashiyama et al. | 345/592 |
| 7,613,563 B2 * | 11/2009 | Haegebarth et al. | 701/117 |
| 7,710,291 B2 * | 5/2010 | Kim et al. | 340/995.1 |
| 2002/0067292 A1 | 6/2002 | Appenrodt et al. | |
| 2002/0072849 A1 * | 6/2002 | Endo et al. | 701/211 |
| 2005/0154505 A1 * | 7/2005 | Nakamura et al. | 701/1 |
| 2006/0103927 A1 * | 5/2006 | Samukawa et al. | 359/436 |
| 2006/0161341 A1 * | 7/2006 | Haegebarth et al. | 701/209 |
| 2007/0005218 A1 * | 1/2007 | Ueyama | 701/96 |
| 2007/0050110 A1 * | 3/2007 | Kondoh et al. | 701/36 |
| 2008/0055114 A1 * | 3/2008 | Kim et al. | 340/937 |
| 2008/0088707 A1 * | 4/2008 | Iwaki et al. | 348/208.1 |

FOREIGN PATENT DOCUMENTS

| | | |
|---|---|---|
| DE | 102 19 788 | 11/2003 |
| DE | 103 10 656 | 9/2004 |
| EP | 1 480 187 | 11/2004 |
| EP | 1 684 094 | 7/2006 |
| EP | 1684094 | * 7/2006 |
| JP | 2001-289651 | 10/2001 |
| JP | 2003337029 | * 11/2003 |

* cited by examiner

*Primary Examiner* — Marthe Marc-Coleman
(74) *Attorney, Agent, or Firm* — Kenyon & Kenyon LLP

(57) ABSTRACT

A method for determining the position of another road user includes the following steps: determining the position of a road user with the aid of a position detection unit; estimating a distance of the road user to the other road user with the aid of a distance sensor; and determining the position of the other road user on the basis of the determined position of the road user, the estimated distance, and a road map, the other road user being assumed to be located in a road area predefined by the road map.

9 Claims, 3 Drawing Sheets

DEVICE AND METHOD FOR DETERMINING THE POSITION OF ANOTHER ROAD USER

BACKGROUND OF THE INVENTION

1. Field of the Invention

The present invention relates to a method and device for determining the position of another road user.

2. Description of Related Art

Driver assistance systems make it easier for the driver of a motor vehicle to detect hazardous situations, among other things. Assessing a threat based on other oncoming, passing vehicles appearing on the side requires a reliable determination of the distance to the particular other vehicle.

A method for determining the distance to other vehicles with the aid of two cameras and triangulation is known from published German patent document DE 102 19 788 C1. Accuracy in determining a distance by triangulation decreases hyperbolically as the distance increases.

BRIEF SUMMARY OF THE INVENTION

The method according to the present invention is used to determine the position of another road user. The following steps are carried out for this purpose: The position of a road user is determined with the aid of a position detection unit. A distance of the road user to the other road user is estimated with the aid of a distance sensor. The position of the other road user is determined on the basis of the position of the road user, the estimated distance, and a road map, the other road user being assumed to be located in a road area predefined by the road map.

The information from the road map is used for adjusting the information from the distance estimate. This may increase the accuracy of the distance determination.

For the purpose of this application, the road area is not understood to be limited to an ordinary road. Instead, a road area includes the usual locations where one can expect to find a moving or stopped road user, in particular a motor vehicle.

According to the present invention, a device for determining the position includes a position detection unit for determining the position of a road user; a distance sensor for estimating a distance of the road user to another road user; and an evaluation unit for determining the position of the other road user on the basis of the position of the road user, the estimated distance, and a road map, the other road user being assumed to be located in a road area.

DETAILED DESCRIPTION OF THE INVENTION

Figure 1:
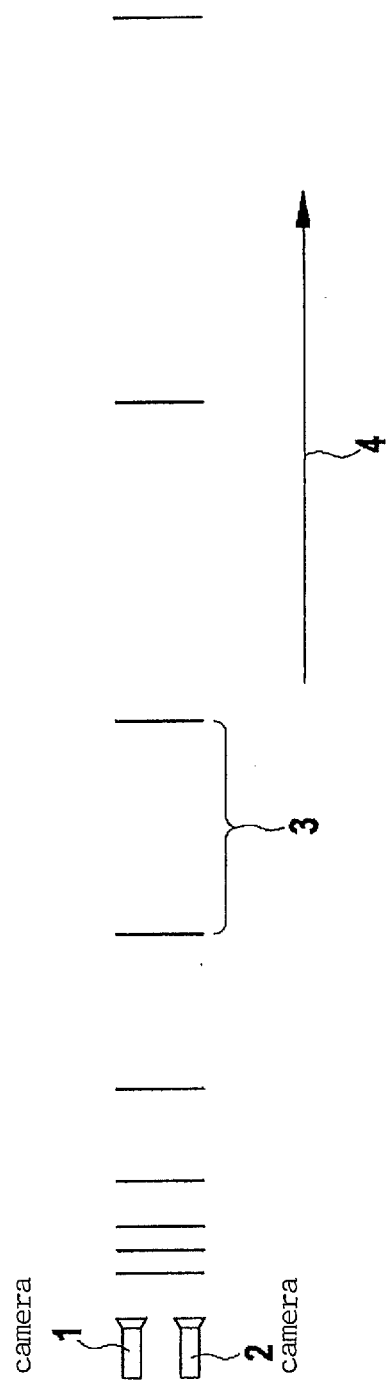
FIG. 1 shows a diagram for illustrating the resolution limit of a camera-based triangulation system.

Optical camera-based methods for determining a distance record a traffic situation from two different directions. In a simple configuration, two cameras 1, 2 are provided for this purpose (FIG. 1). The two cameras 1, 2 record two different images of a road user. The distance of the road user to the cameras establishes the relative displacement of the road user's representation in the two different images. The distance may be determined from the displacement according to the principles of triangulation.

The greater the distance of the road user from the cameras, the smaller the relative displacement in the images. The distance is approximately in reverse proportion to the distance in the images. It can be inferred therefrom that an error in determining the distance increases as the distance increases.

The cameras have a limited spatial resolution. This may be caused, among other things, by the grid pattern of a CCD sensor. The distance to two road users may no longer be discerned if the road users undergo the same displacement in the particular images in the grid pattern of the sensor. By way of illustration, areas 3 for distances 4, which are not distinguishable by a stereoscopic camera system, are drawn in FIG. 1.

Figure 2:
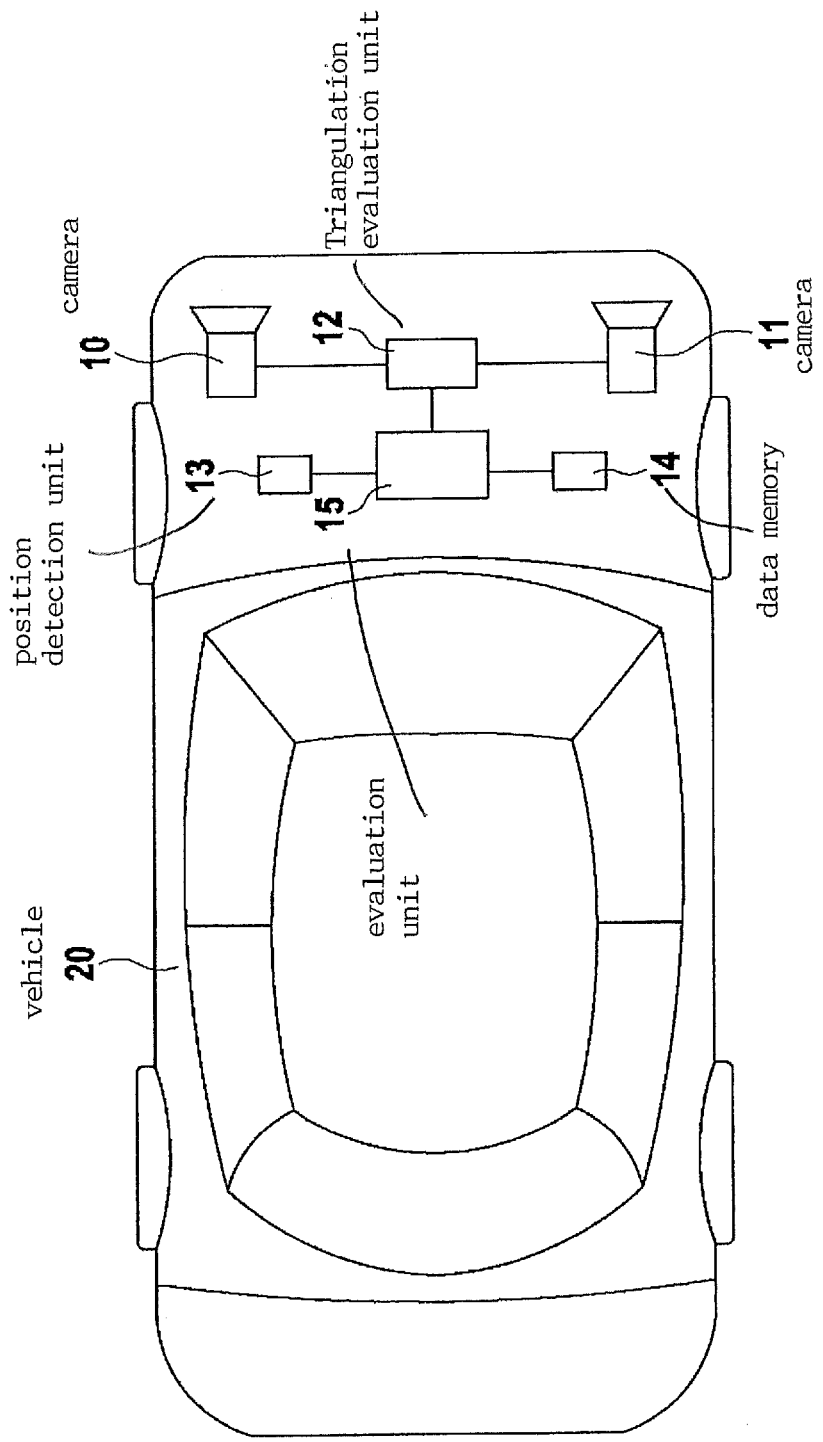
FIG. 2 shows an example embodiment of a device for determining the position of another road user.

FIG. 2 shows a device for determining the position of another road user according to am example embodiment in the form of a block diagram. The device includes two cameras 10, 11, a triangulation evaluation unit 12, a position detection unit 13, a data memory 14 having stored road maps, and an evaluation unit 15.

The two cameras 10, 11 and triangulation evaluation unit 12 estimate the distance to another road user. According to the example embodiment, more than two cameras may be used to increase the resolution. Individual example embodiments use a single camera, which records images from two different directions simultaneously or delayed.

Other optical distance sensors may also be used instead of cameras. Among other things, this includes radar sensors, which may enable a distance to be determined by measuring the propagation time as well as by using an angle-resolved distance measurement.

In addition to the distance, triangulation evaluation unit 12 may also determine the direction or only the direction in relation to another road user. The angle-resolved measurement may also be determined by triangulation.

Position detection unit 13 may be a navigation device of a vehicle. The navigation device may determine the position of the vehicle by using the GPS signal of the global positioning system.

Other position detection units record the route distance covered and changes in direction. For example, acceleration sensors are used for this purpose.

Further position detection units determine the position of the vehicle on the basis of route markings provided in the surrounding area. An example embodiment compares the determined position of the vehicle with road maps for plausibility.

The road maps provided in data memory 14 contain information about locations and the position alongside or on a road. They may also have information about road shoulders, entrances/on-ramps, exits/off-ramps, parking areas, pedestrian zones, bicycle paths, etc. The map material should contain position information for all locations where motor vehicles or other road users may be situated.

The map material may contain additional information which indicates the likelihood of a vehicle being present in the corresponding locations. Thus, the likelihood of encountering a motor vehicle is high on a road open to traffic, such as a highway, while the likelihood thereof is low on the shoulder or a sidewalk.

Evaluation unit 15 ascertains a possible position of the other road user from the estimated distance to the other road user and/or the estimated direction in relation to the other road user and the unit's own position.

On the basis of the stored road map, evaluation unit 15 determines the location which is closest to the possible position of the other road user and, at the same time, is on a road. A maximum likelihood estimate, a minimum value search of a distance vector, etc., may be used to establish locations of this type. The established location is output as a specific position of the other road user.

Evaluation unit 15 may be configured to take into account only specific locations where a vehicle is likely to be found. The configuration may be carried out, for example, automatically on the basis of the traffic situation. When driving on the highway, only the lane being traveled and the corresponding shoulder need to be taken into account, but not sidewalks, bicycle paths, or unpaved roads.

In a further embodiment, the type of the other road user is first ascertained. Based on the type of road user, only certain locations are taken into account. For a motor vehicle, the selection of location may be limited to roads open to traffic, shoulders, entrances/on-ramps, etc.

Another example embodiment takes into account the velocity of the other road user. Stopped vehicles are first expected only in the area in front of traffic lights, in parking areas and on shoulders, and these locations may therefore be excluded from the selection to be taken into account.

Figure 3:
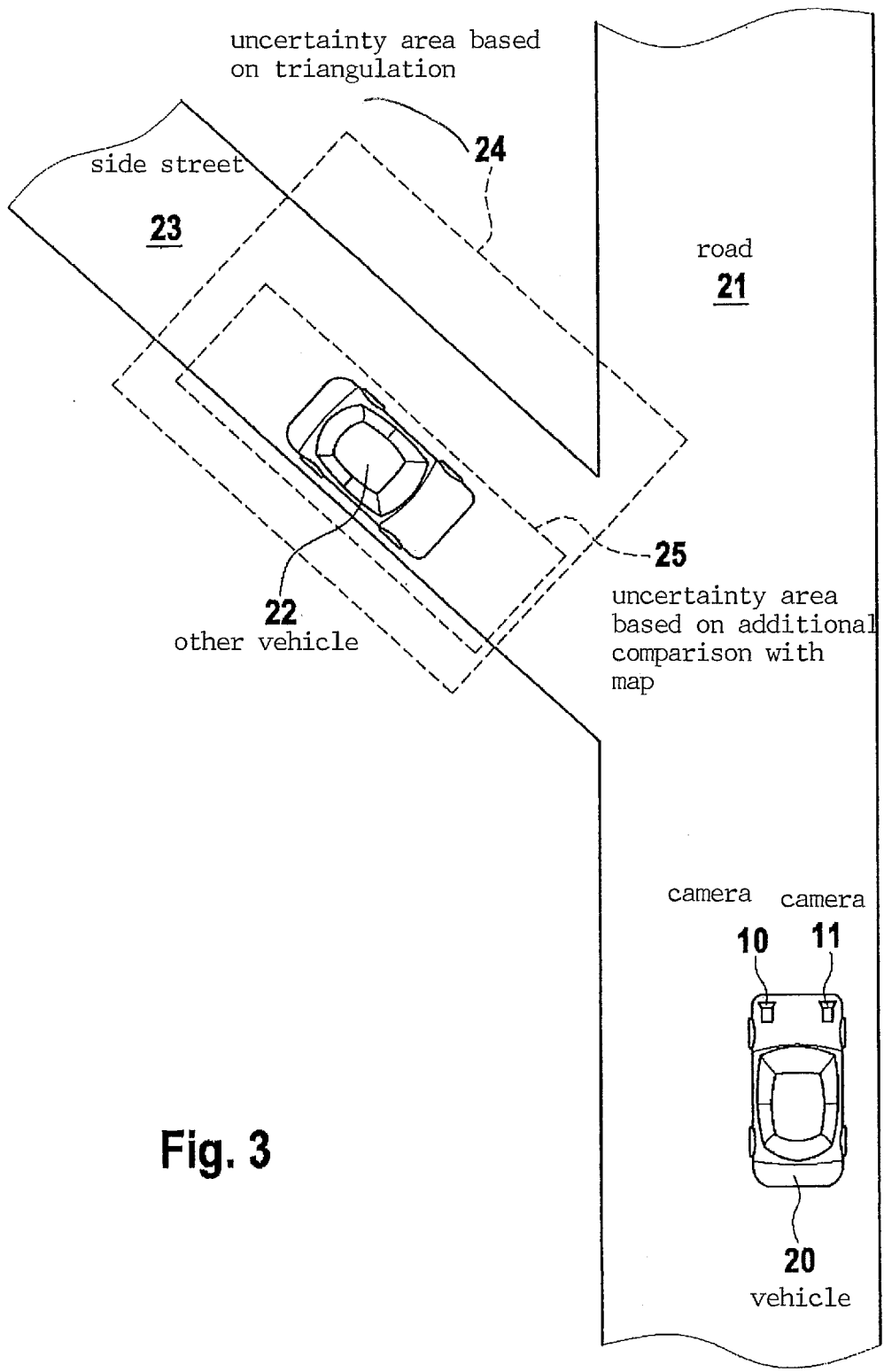
FIG. 3 shows an exemplary traffic situation for illustrating the example embodiment.

FIG. 3 shows an exemplary traffic situation. Vehicle 20 is located on a road 21. Another vehicle 22 is located on a side street 23.

Area 24 indicates the uncertainty with which the position of other vehicle 22 is determined solely on the basis of a triangulation measurement. The additional comparison using the map material in data memory 14 may reduce the uncertainty to area 25.

What is claimed is:

1. A method for providing driving assistance for a host road user by determining the position of a target road user, comprising:
   determining the position of the host road user with the aid of a position detection unit;
   estimating a distance of the host road user to the target road user with the aid of a distance sensor; and
   determining the position of the target road user on the basis of (i) the determined position of the host road user, (ii) the estimated distance to the target road user, and (iii) a road map, wherein the target road user is assumed to be located in a road area predefined by the road map, and wherein information from the road map is used to adjust the estimated distance.

2. The method as recited in claim 1, wherein the estimating of the distance to the target road user includes:
   using an optical-camera-based method for determining a distance to record the target user from two different directions; and
   estimating the distance to the target road user by a triangulation method.

3. The method as recited in claim 2, wherein a direction of the host road user in relation to the target road user is estimated, and wherein the position of the target road user is determined by taking into account the estimated direction of the host road user in relation to the target road user.

4. The method as recited in claim 2, wherein the position of the host road user is determined with the aid of at least one of a navigation system, a satellite-supported navigation system, and a tracking system.

5. The method as recited in claim 2, wherein the determination of the position of the target road user involves ascertaining a location on the road map having a distance to the road user deviating by the least amount from the estimated distance.

6. The method as recited in claim 3, wherein the determination of the position of the target road user involves ascertaining a location on a road recorded on the road map with the following characteristics: (i) a distance to the host road user deviates by the least amount form the estimated distance; and (ii) a direction in relation to the host road user deviates by the least amount from the estimated direction.

7. The method as recited in claim 5, wherein the road area predefined by the road map includes at least one of a road open to traffic, a shoulder, a parking area, an on-ramp, an off-ramp, a bicycle path, and a sidewalk.

8. The method as recited in claim 7, further comprising:
   determining a type of the target road user;
   wherein the road area predefined by the road map is selected as a function of the type of the target road user.

9. A device for providing driving assistance for a host road user by determining the position of a target road user, comprising:
   a position detection unit configured to determine the position of the host road user;
   a distance sensor configured to estimate a distance of the host road user to the target road user; and
   an evaluation unit configured to determine the position of the target road user on the basis of (i) the determined position of the host road user, (ii) the estimated distance to the target road user, and (iii) a road map, wherein the target road user is assumed to be located in a road area predefined by the road map, and wherein information from the road map is used to adjust the estimated distance.

* * * * *

UNITED STATES PATENT AND TRADEMARK OFFICE
CERTIFICATE OF CORRECTION

PATENT NO.       : 8,612,150 B2                                     Page 1 of 1
APPLICATION NO.  : 12/735439
DATED            : December 17, 2013
INVENTOR(S)      : Heger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 542 days.

Signed and Sealed this
Twenty-second Day of September, 2015

Michelle K. Lee
*Director of the United States Patent and Trademark Office*